United States Patent

Yamaki et al.

Patent Number: 6,146,577
Date of Patent: Nov. 14, 2000

[54] METHOD FOR INJECTION MOLDING OF THERMOPLASTIC RESINS

[75] Inventors: Hiroshi Yamaki; Yoshimasa Matsuura, both of Kawasaki; Hiroshi Kataoka, Oota-ku, all of Japan

[73] Assignee: Asahi Kasei Kogyo Kabushiki Kaisha, Japan

[21] Appl. No.: 09/230,273

[22] PCT Filed: May 20, 1998

[86] PCT No.: PCT/JP98/02220

§ 371 Date: Jan. 20, 1999

§ 102(e) Date: Jan. 20, 1999

[87] PCT Pub. No.: WO98/52734

PCT Pub. Date: Nov. 26, 1998

[30] Foreign Application Priority Data

May 21, 1997 [JP] Japan ................................. 9-131165

[51] Int. Cl.[7] .................................................. B29C 45/00
[52] U.S. Cl. ..................................... 264/500; 264/328.17
[58] Field of Search .......................... 264/50, 45.5, 500, 264/328.17

[56] References Cited

U.S. PATENT DOCUMENTS

| | | | |
|---|---|---|---|
| 4,101,617 | 7/1978 | Friederich | 264/572 |
| 4,208,368 | 6/1980 | Egli | 264/45.5 |
| 4,255,368 | 3/1981 | Olabisi . | |
| 4,948,547 | 8/1990 | Hendry | 264/500 |
| 4,990,595 | 2/1991 | Traechkner et al. | 528/483 |
| 5,700,407 | 12/1997 | Branger | 264/52 |
| 5,716,561 | 2/1998 | Guergov | 264/51 |
| 5,972,276 | 10/1999 | Yasuda et al. | 264/500 |
| 5,985,946 | 11/1999 | Smith et al. | 521/97 |
| 5,997,781 | 12/1999 | Nishikawa et al. | 264/50 |

FOREIGN PATENT DOCUMENTS

| | | |
|---|---|---|
| 826477A2 | 3/1998 | European Pat. Off. . |
| 62-16166 | 4/1987 | Japan . |
| 5-318541 | 12/1993 | Japan . |

*Primary Examiner*—Allan R. Kuhns
*Attorney, Agent, or Firm*—Pennie & Edmonds LLP

[57] ABSTRACT

An economical method for facilitating injection molding of a thermoplastic resin by reducing the viscosity of a molten resin without impairing the physical properties of the resin, the surface appearance of the molded article and productivity. In the method for injection molding of a thermoplastic resin, a thermoplastic resin in which not less than 0.2% by weight of carbon dioxide is dissolved is injected into a mold cavity pressurized with a gas beforehand to at least a pressure where foaming does not take place in the flow front of the molten resin.

4 Claims, 1 Drawing Sheet

METHOD FOR INJECTION MOLDING OF THERMOPLASTIC RESINS

TECHNICAL FIELD

The present invention relates to a method for facilitating filling of a resin into a mold cavity in injection molding of a thermoplastic resin so as to transfer the mold surface state precisely onto a molded article surface.

BACKGROUND ART

In injection molding of a thermoplastic resin, the resin is generally heated and melted at a temperature to obtain sufficient flowability of the resin for filling into a mold cavity. The flowability of the molten resin affects not only ease of filling into a mold cavity but also sufficiency of pressure transmission to the resin filled in the cavity. Therefore, it also affects dimensional precision and external appearance of molded articles, and transfer of fine information of the mold surface as required for molded articles such as optical disks. Thus, the molten resin flowability is an important factor for the moldability of a resin. An index of the flowability of the molten resin is the melt viscosity of a resin.

Thermoplastic resins have a high melt viscosity and is inferior in flowability as a molding material. This tends to cause poor appearance such as irregular gloss and weld-line of the molded article, poor transfer of fine pattern of a mold surface such as pits of an optical disk, and incomplete filling of a resin into a thin article portion in the mold, disadvantageously.

Conventionally, there are the following three methods for modifying resins to improve the flowability thereof. The first method is lowering of the molecular weight of a resin, for example, by lowering the average molecular weight or by broadening the molecular weight distribution to increase the content of low molecular components. This method is disadvantageous in that the impact strength and chemical resistance are deteriorated although the flowability is improved. The second method is introduction of a comonomer into the molecule. This method is disadvantageous in that the rigidity of the molded article is deteriorated at high temperatures. The third method is addition of a plasticizer such as a low molecular weight oily substance, e.g., a mineral oil, and a higher fatty acid ester. This method is disadvantageous in that the rigidity upon application of heat is deteriorated by the plasticizer, or the plasticizer adheres onto a mold during the molding operation to stain the mold.

With regard to molding conditions for increasing the flowability, it is effective to elevate a resin temperature or a mold temperature. However, higher temperatures of a resin cause thermal decomposition of the resin itself or of additives to thereby tend to deteriorate the strength of molded articles or to cause undesired foreign matter generation, mold staining, and resin discoloration due to the deterioration of the resin. Further, higher temperatures of a mold retard the cooling of a resin in a mold to lengthen the molding cycle time, disadvantageously.

On the other hand, it is known that when carbon dioxide is absorbed by a resin, it serves as a plasticizer to lower the glass transition temperature of the resin, as disclosed in many documents such as J. Appl. Polym. Sci., Vol.30, p. 2633 (1985). This phenomenon has not been widely utilized in resin molding. One of a few application examples thereof is a method disclosed in JP-A-5-318541 (The term "JP-A" as used herein means an "unexamined published Japanese patent application") in which a gas such as carbon dioxide and nitrogen is dissolved into a thermoplastic resin, and the resin is filled into a cavity while the gas in the cavity is removed, to thereby improve the resin flowability and to produce molded articles without deterioration in strength and external appearance. In this method, however, the amount of the gas dissolved in the resin is as small as 0.18% by weight at the maximum if carbon dioxide is used as the gas. Such a small amount is insufficient to achieve the desired improvement of flowability. Since the cavity is kept at the atmospheric pressure or a reduced pressure in this method, the external appearance of the molded article surface is liable to be impaired by foaming caused at the flow front in the resin-filling step.

A counter pressure molding method is known as a technique of producing a foamed thick article with satisfactory appearance without surface sink or warpage using a resin containing a foaming agent, as disclosed in JP-B-62-16166 (The term "JP-B" as used herein means an "examined Japanese patent publication"). In this counter pressure molding, a molten resin containing a foaming gas is injected into a cavity filled with compressed air, and the compressed air in the cavity is then released out of the mold to cool the resin with maintaining the cavity pressure at a low pressure. In this method, foaming at the flow front is suppressed during the filling of the resin so that a molded article foamed only inside without foaming pattern on the surface of the molded article is produced. In the counter pressure molding, a cavity is almost fully filled with a molten resin of a non-foamed state, and thereby the molten resin inside a solidified surface layer formed during the filling of the resin is cooled and shrinks to cause foam formation at a degree corresponding to the volume shrinkage accompanied by the cooling. Therefore, it can be basically considered that the amount of the gas dissolved into the resin for imparting a foaming property to the resin be the minimum amount for compensating the volume shrinkage by foaming. Generally, the content of gas in a resin is less than 0.1% by weight with respect to nitrogen, and less than 0.15% by weight with respect to carbon dioxide. In the Example of JP-B-62-16166, the content of the nitrogen gas is estimated to be from 0.01 to 0.15% by weight, which cannot improve the resin flowability.

The object of the present invention is to provide an economical method for facilitating injection molding of a thermoplastic resin by reducing the viscosity of a molten resin without impairing the physical properties of the resin, the surface appearance of the molded article and productivity.

As a result of extensive studies to achieve the above object, the inventors of the present invention found that when a specific amount of carbon dioxide is dissolved in a molten resin, it serves as a plasticizer during only a molding process and diffuses out into the air after the molding. Thus, the viscosity of the molten resin can be reduced without changing the resin properties, to thereby facilitate the molding. The present invention has been accomplished by this finding.

DISCLOSURE OF THE INVENTION

The present invention is as follows:

1. A method for injection molding of a thermoplastic resin, which comprises injecting a molten resin in which not less than 0.2% by weight of carbon dioxide is dissolved so as to lower the melt viscosity thereof, into a mold cavity pressurized with a gas beforehand to at least a pressure where foaming does not take place in the flow front of the molten resin.

2. The method for injection molding according to the above 1, wherein the gas for pressurizing the mold cavity is carbon dioxide.

3. The method for injection molding according to the above 1 or 2, further comprising pressurizing the resin after the injection thereof into the mold cavity.

4. The method for injection molding according to the above 1 or 2, wherein the amount of the carbon dioxide dissolved in the molten resin is not lower than 0.2% by weight and not higher than 3% by weight.

5. The method for injection molding according to the above 1, wherein the pressure of the gas that pressurizes the mold cavity is above the atmospheric pressure and not higher than 15 MPa.

BEST MODE FOR CARRYING OUT THE INVENTION

Figure 1:
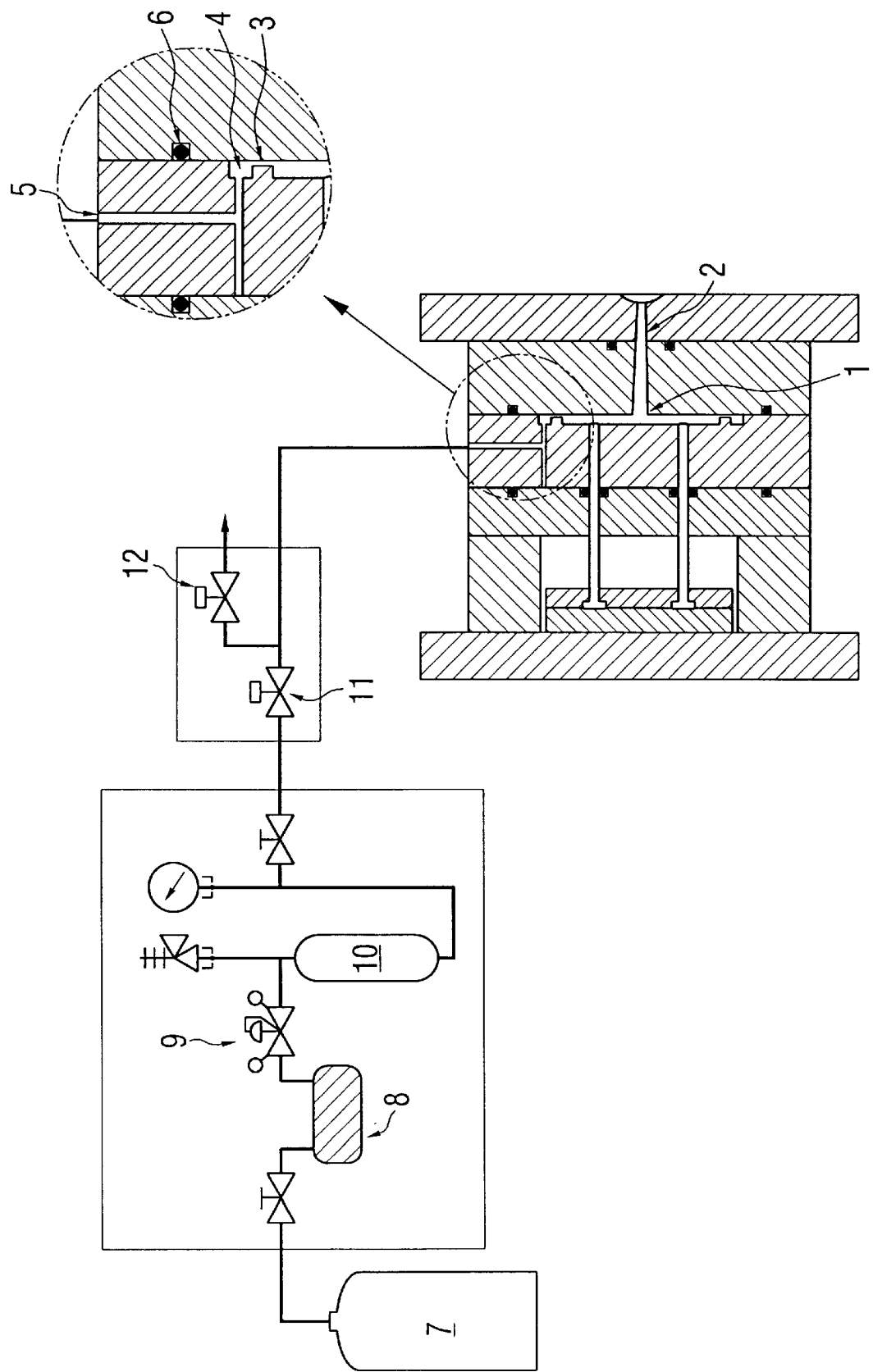
FIG. 1 shows a structure of a square flat plate mold and a construction of a gas feeding system for counter pressure molding each for practicing the present invention.

The present invention is explained in detail below.

The thermoplastic resin for use in the molding method of the present invention includes thermoplastic resin materials such as polyethylenes, polypropylenes, polyvinyl chlorides, acrylic resins, styrenic resins, polyethylene terephthalates, polybutylene terephthalates, polyarylates, polyphenylene ethers, modified polyphenylene ethers, all aromatic polyesters, polyacetals, polycarbonates, polyether imides, polyether sulfones, polyamides, polysulfones, polyether ether ketones, and poly ether ketones; blends of one or more thereof; and compositions thereof further containing a filler.

The styrenic resin for use herein includes homopolymers and copolymers containing styrene as the essential component, and polymer blends obtained from these polymers with other resins, and is preferably a polystyrene, and an ABS resin. The polystyrene includes styrene homopolymers and rubber-reinforced polystyrenes containing rubber distributed in the resin phase.

The thermoplastic resin is preferably one having high affinity with carbon dioxide, and having high solubility for carbon dioxide. Particularly preferred examples thereof includes polyethylenes, polypropylenes, styrenic resins, polyacetals, polycarbonates, polyphenylene ethers, and modified polyphenylene ethers. In particular, the polycarbonate resins are especially suitable for the present invention because of the following reason. That is, they are advantageous in that not only because they have a high solubility for carbon dioxide, but also they generate carbon dioxide upon decomposition thereof, the equilibrium of the decomposition reaction shifts to decrease the thermal decomposition rate when carbon dioxide is contained in the molten resin.

According to the present invention, various resins not readily moldable can be suitably used: for example, thermoplastic resins having a molecular weight excessively high for injection molding, resins having low thermal stability liable to cause thermal decomposition, resins having a high softening temperature so as to require considerably a high temperature for molding, and resins containing an additive like a flame retardant that readily undergoes thermal decomposition.

The method of the present invention is applicable to thermoplastic resins which are moldable by usual extrusion molding but have poor flowability for injection molding, and to thermoplastic resins which have excessively high molecular weight for injection molding. The examples of the resins are shown below.

(1) Acrylic resins having a melt flow rate of 1.0 or lower, preferably 0.5 or lower:
(2) Polystyrene resins having a melt flow rate of 1.5 or lower, preferably 1.0 or lower:
(3) Rubber-reinforced polystyrene resins having a melt flow rate of 2.0 or lower, preferably 1.5 or lower:
(4) ABS resins having a melt flow rate of 3.0 or lower, preferably 2.5 or lower:
(5) Polycarbonate resins having a melt flow rate of 6.0 or lower, preferably 5.0 or lower:
(6) Polyphenylene ether resins, or modified polyphenylene ether resins containing polyphenylene ether at a content of 60% by weight or higher, preferably 70% by weight or higher:
(7) Polyacetal resins having a melt flow rate of 5.0 or lower, preferably 3.0 or lower:
(8) Polyethylene resins having a melt flow rate of 5.0 or lower, preferably 3.0 or lower:
(9) Polypropylene resins having a melt flow rate of 5.0 or lower, preferably 3.0 or lower: and
(10) Thermoplastic resins containing a readily thermally decomposable flame retardant.

The melt flow rate used herein is a value measured according to JIS K7210 under the usual measurement conditions described in the above JIS for respective resins: for examples, under Conditions 15 for acrylic resins, under Conditions 8 for polystyrene resins and rubber-reinforced polystyrene resins, under Conditions 11 for ABS resins, under Conditions 20 for polycarbonate resins, under Conditions 4 polyacetal resins and polyethylene resins, and under Conditions 14 for polypropylene resins. The unit of the melt flow rate is g/10 min.

Generally, higher molecular weights improve chemical resistance, impact resistance, etc. of the molded articles, but provide deteriorated flowability upon molding, to thereby make it difficult to carry out injection molding. Since extrusion molding does not require so high flowability as required in injection molding, polymers of a higher molecular weight are generally used in the extrusion molding. In the present invention, high molecular weight polymers that are moldable by extrusion but are not used in injection molding methods can be satisfactorily used.

Examples of the thermoplastic resin having a softening temperature excessively high for injection molding include polyphenylene ether resins, and modified polyphenylene ether resins composed of a mixture of a polyphenylene ether and a polystyrene or rubber reinforced polystyrene in a mixing ratio of from 100:0 to 60:40. The polyphenylene ether resin, which has poor moldability, is generally used as a blend prepared by incorporating more than 40% by weight of a polystyrene or rubber-reinforced polystyrene. However, the molding method of the present invention can also be applied to mixing ratios where the proportion of the rubber-reinforced polystyrene is not more than 40% by weight.

The method of the present invention is also applicable to resins having a high softening temperature or a low decomposition temperature which decomposes or deteriorates in physical properties if heated so as to obtain sufficient flowability of the molten resin, and provides high flowability at a low temperature. Generally, in the case where the thermoplastic resin is an amorphous resin, molding can be effected at a melt temperature of not higher than the glass transition temperature of the carbon dioxide-free resin plus 150° C., and in the case of a crystalline thermoplastic resin, molding can be effected at a melt temperature of not higher than the melting point of the carbon dioxide-free resin plus 100° C.

Carbon dioxide is used in the present invention as the plasticizer to be blended into a thermoplastic resin for lowering the melt viscosity. However, any kind of plasticizer may be used, provided that it has a high solubility in molten resins, it does not deteriorate resins, a mold, or molding machine-constructing materials, it does not damage molding environments, it is not expensive, and it rapidly evaporates from the molded article after molding. If appropriate, the plasticizer may be used in combination with a liquid such as saturated hydrocarbons having from 1 to 5 carbons, flons derived from the hydrocarbons by partially substituting hydrogen with fluorine, water, alcohols, and mixtures of two or more thereof.

It is difficult to directly determine the amount of the carbon dioxide in the molten resin to be injected into a mold cavity. Therefore, in the present invention, the amount of the carbon dioxide in the molten resin to be injected into a mold cavity is defined as the difference of: the weight of the molded article measured immediately after the injection molding of the carbon dioxide-containing resin; and the weight of the molded article after standing in a hot-air drier for 24 hours at a temperature lower by about 30° C. than the glass transition temperature for an amorphous resin or than the melting point for a crystalline resin to diffuse the carbon dioxide from the molded article into the air to obtain a constant weight. In this measurement, the derived amount of carbon dioxide is approximately the same whether or not a counter pressure molding is used, and the difference therebetween is negligible.

The glass transition temperatures of thermoplastic resins in the present invention is defined by the onset temperature in a temperature-flow curve obtained by a differential scanning calorimetry (DSC) measurement with a temperature elevation rate of 20° C./min. If plural onset temperatures are detected, the highest of the temperatures is defined as the onset temperature of the resin. The melting point is defined as the endothermic peak temperature caused by resin melting in the temperature-heat flow graph obtained by the measurement as above.

The counter pressure molding as used herein includes any molding methods in which a resin is injected into a mold cavity pressurized with a gas to at least a pressure where foaming does not take place in the flow front of the molten resin during the resin filling stage. A usual pressure-holding method where a resin is cooled and solidified under a high pressure may be employed in combination. The pressure-holding method includes a resin-pressurizing method in which a molten resin is charged supplementarily to the mold cavity, an injection method in which a pressurized gas or a like fluid is injected into the resin or the interface between the resin and the mold, and an injection compression method in which the cavity volume is decreased.

Carbon dioxide is readily soluble in thermoplastic resins to become an effective plasticizer to improve the flowability of the thermoplastic resin.

In the present invention, the amount of carbon dioxide dissolved in a molten thermoplastic resin is not less than 0.2% by weight. For remarkably improving the flowability, the amount should be not less than 0.2% by weight, and is preferably not less than 0.3% by weight. The upper limit of the dissolved carbon dioxide is about 3% by weight. An excessive amount of the dissolved carbon dioxide is not so effective for the flowability improvement, but tends to cause foaming of the resin by vaporization of the carbon dioxide, and greatly increases the necessary gas pressure in the mold (counter pressure) even if foaming pattern formation on the molded article surface is prevented by the counter pressure method. The amount of the carbon dioxide is preferably not more than 3% by weight, more preferably not more than 2% by weight.

In the counter pressure molding which intends foam formation by employing carbon dioxide as a foaming gas, there is case where a chemical foaming agent such as sodium bicarbonate and citric acid is plasticized with the resin and the carbon dioxide produced by thermal decomposition of the chemical foaming agent is dissolved into the resin. However, the use of the chemical foaming agent in order for decreasing the melt viscosity is not practical. This is because the plasticizing effect of the chemical forming agent is lower than carbon dioxide, the use thereof is accompanied with the generation of water that is reluctant to diffuse out from the resin, a powdery decomposed product of the foaming agent remains in the resin to deteriorate the resin properties and surface smoothness of the molded product, and the chemical foaming agent is expensive for the amount of the generated gas.

Carbon dioxide is dissolved in the thermoplastic resin preferably by either of the two method described below. In a first method, a particulate or granular resin is stored preliminarily in a carbon dioxide atmosphere to allow the resin to absorb the carbon dioxide before feeding to a molding machine. The amount of the absorbed gas depends on the carbon dioxide pressure, the atmosphere temperature, and the absorption time. In this method, as the resin is heated at the time of plasticization, a part of the carbon dioxide in the resin volatilizes, so that the amount of the carbon dioxide in the resin decreases from the preliminarily absorbed amount. Therefore, the resin feeding route such as a hopper of a molding machine is preferably kept under a carbon dioxide atmosphere. In a second method, carbon dioxide is dissolved into a resin during or after plasticization in a cylinder of a molding machine. In this method, the vicinity of the hopper of the molding machine is covered by a carbon dioxide atmosphere, or carbon dioxide is introduced from the middle portion or the tip of a screw, or from a cylinder. For introducing carbon dioxide from the middle portion of the screw or cylinder, the screw flight depth is preferably made larger around the gas-introducing portion to lower the resin pressure. Further, for uniform dissolution and dispersion into the resin after introduction of carbon dioxide, preferably a mixing mechanism such as a damage or a blending pin is provided in the screw, or a static mixer is provided in the resin flow path. The injection machine may be of an in-line screw type or a screw preplunger type. The screw preplunger type machine is especially preferred since the screw design of the extruding portion for resin plasticization or the position of the carbon dioxide introduction can readily be changed.

The carbon dioxide in the thermoplastic resin is gradually emitted into the air after solidification of the thermoplastic resin during storage in the open air. However, the gas emission produces no foam in the molded article, and the properties of the molded article after the gas emission is the same as the inherent properties of the thermoplastic resin.

In the present invention, the mold cavity is preliminarily pressurized with a gas to at least a pressure where foaming does not take place in the flow front of the molten resin during resin filling stage, and subsequently injection molding is conducted. The pressure of the gas introduced into the cavity may be the minimum pressure for eliminating an foam pattern on the molded article surface. Lower gas pressure is preferred for minimizing the amount of the gas for one molding step and to simplify the structure of the seal of the mold cavity and the gas feeding system. At the gas pressure higher than 15 MPa, problems tend to be caused such that the internal pressure to drive the mold to open becomes not negligible, sealing of the mold cavity becomes difficult, and the like. Therefore, the pressure of the gas for pressurizing the mold cavity is preferably not higher than 15 MPa.

The gas to be introduced into the mold cavity for pressurization includes various simple gases and mixture thereof inert to the resin, such as air and nitrogen. However, carbon dioxide, hydrocarbons, and partially fluorine-substituted hydrocarbons are preferred, which has higher solubilities in thermoplastic resins. Carbon dioxide is especially useful since it improves effectively the transferability of the mold surface state onto the molded article. In the case where an amorphous resin is employed and the cavity is pressurized by carbon dioxide, a higher gas pressure in the cavity will result excellent transferability as disclosed in Japanese Patent Application Nos. 9-236763 and 10-46903. Therefore, when highly precise transfer is required, the gas pressure is preferably raised to the possible maximum pressure in accordance with the clamping force of the molding machine and sealing ability of the mold. The gas in the mold cavity preferably contains carbon dioxide at a higher content, particularly not lower than 80% by volume. The temperature of the gas is not limited. The gas may be at an atmospheric temperature, and heated gas also can be used satisfactorily. When the gas is heated, a heated gas mixture of carbon dioxide and a vapor of a liquid that readily dissolves therein carbon dioxide can be used satisfactorily.

In the present invention, there can be also satisfactorily used a molding method in which a first thermoplastic resin containing carbon dioxide at a content of 0.2 to 3% by weight and a second thermoplastic resin are successively or simultaneously injected into a mold cavity. Particularly suitable is an injection molding method in which a first thermoplastic resin containing carbon dioxide at a content of 0.2 to 3% by weight is firstly injected and a second thermoplastic resin containing no carbon dioxide is secondly injected into a mold cavity. The second thermoplastic resin may be the same kind as the first thermoplastic resin containing carbon dioxide at a different content, or having different molecular weight; another kind of thermoplastic resin containing carbon dioxide at a different content; or combination thereof. By introducing carbon dioxide into the first thermoplastic resin to lower the melt viscosity, a composite injection molded article can be obtained which has a uniform surface layer of the first thermoplastic resin and an inner core of the second thermoplastic resin. The properties of the molded article can be improved by using the first thermoplastic resin having desired properties such as heat resistance, chemical resistance and physical properties to form the surface layer of the first thermoplastic resin.

Orientation of polymer chains in a molded article can be decreased by use of the first thermoplastic resin containing carbon dioxide at a content not lower than 0.2% by weight to increase the flowability of the first thermoplastic resin. More specifically, in injection molding, a thermoplastic resin flows in a mold cavity in a movement pattern called a fountain flow. The injected thermoplastic resin solidifies to form a layer on a cooled wall of a mold upon contact therewith, and the subsequently injected resin flows and proceeds inside the solid layer. The shear rate is the highest at the interface between the solid layer and the flowing inner layer. The polymer chains are oriented at the highest degree in the interface region where the shear rate is higher. The contained carbon dioxide increases the flowability of the first thermoplastic resin to reduce this orientation in the interface region, resulting in decrease of orientation of the polymer chain of the molded product as a whole, decrease of birefringence, increase of impact strength, and other improvements.

The molding method of the present invention is suitable for molding thermoplastic resin articles including optical device parts; housings of light electrical appliances, electronic devices and business machines; automobile parts; and articles for daily use. The molding method of the present invention is particularly suitable for molding housings of electronic device, electrical appliances and business machines, which are produced from an amorphous resin by injection molding through multiple gates to thereby tend to cause undesired formation of many weld line. The method of the present invention is also useful for molding embossed articles of eggshell texture or pattern-embossed articles. The method of the present invention is promising also in molding of a thin case of a handy personal computer for ease of the molding, improvement of the molded articles, and a greater freedom in product designing. Furthermore, the method of the present invention is useful for molding optical parts from transparent thermoplastic resin, the optical parts including lenses such as lenticular lenses, and Fresnel lenses; recording disks such as optical disks; optical guide plates as liquid crystal display parts; and optical diffusion plates. These articles molded according to the method of the present invention have a surface corresponding to the mold surface transferred with high reproducibility, having improved gloss, less conspicuous weld lines, and high reproducibility of sharp edge of the mold surface and of fine projections and concaves of the mold.

Furthermore, the present invention facilitates molding of resins not readily moldable in spite of satisfactory properties thereof, such as ultra-high-molecular-weight polyethylene and polyphenylene ethers, and resins containing a flame retardant which are difficult to be molded at a high temperature owing to their poor thermal stability.

EXAMPLES

The effects of the present invention are described in greater detail with reference to the following Examples and Comparative Examples.

Resin

The resins employed in the injection molding are shown below. All of the resins were in a pellet state before the injection molding.

Polycarbonate resin (Panlite L1225, produced by Teijin Kasei K. K.)

Rubber-reinforced polystyrene resin (Styron 492, produced by Asahi Chemical Industry Co.)

Acrylic resin (Delpet 80NH, produced by Asahi Chemical Industry Co.)

Modified polyphenylene ether resin (blend of polyphenylene ether 80% by weight and polystyrene 20% by weight)

Gas

Carbon dioxide having a purity of not lower than 99% was used as the gas.

Molding machine

An injection molding machine SG50, and SG125M-HP manufactured by Sumitomo Heavy Industries, Ltd. were employed. The resin plasticizing portion extending from the hopper to the screw was in the atmospheric air.

Mold

The molds used were one for providing a square-shaped molded article and one for providing a rectangle-shaped molded article. The mold for the square flat plate had a product portion of 100 mm square and 2 mm thick. This mold was mounted to the injection molding machine SG50. The mold for the rectangular flat plate had a product portion of 120 mm long, 60 mm wide, and 2 mm thick. This mold was mounted to the injection molding machine SG125M-HP.

FIG. 1 shows the structure of the mold for the square flat plate. The surface of the cavity was mirror-polished, a direct gate 1 having an 8 mm diameter was provided at the center of the molded plate, a sprue 2 had a length of 58 mm, and a nozzle-touching portion had a diameter of 3.5 mm. In the periphery of the cavity in the mold, a vent slit 3 of 0.05 mm deep, a vent 4, and a hole 5 communicating the vent 4 with the outside were provided for gas feed and gas release. The hole 5 was connected to a gas feeding apparatus. O-rings 6 were fit to the peripheries of the vent slit and the hole to seal the cavity to be gas-tight.

In the rectangle plate mold, the gate had a width of 3 mm and a thickness of 2 mm; the land had a length of 3 mm; the runner had a nearly square section of an average width of 4 mm and a depth of 4 mm, and a runner length of 140 mm; the sprue had an average diameter of 4 mm, and a length of 55 mm; and the nozzle-touching portion had a diameter of 3.5 mm. The periphery of the cavity had the same structure as the square plate mold except the gate portion. The peripheries of the cavity, the sprue, and the runner were sealed with O-rings to make the cavity gas-tight.

Gas-feeding System for Counter Pressure Molding

FIG. 1 shows the structure of the gas-feeding system for counter pressure molding. The gas source was a gas cylinder 7 filled with liquified carbon dioxide, and kept at 30° C. The gas was fed from the gas cylinder through a heater 8 and a pressure-reducing valve 9 for controlling the pressure to a prescribed level to a gas holder 10 of a holding volume of 1000 cm$^3$ kept at about 40° C. The gas was fed to the mold cavity by opening a feeding magnetic valve 11 at the downstream side of the gas holder and simultaneously closing a release magnetic valve 12, and the gas holder and the cavity was kept connected during the resin filling stage. As soon as the filling with the resin was completed, the feeding magnetic valve 11 was closed and the release magnetic valve 12 was opened simultaneously to release the gas out of the mold.

Cylinder Temperature

The temperature of the cylinder at the injection molding was set at 250° C. for the polycarbonate resin, 220° C. for the rubber reinforced polystyrene resin, 240° C. for the acrylic resin, and 320° C. for the modified polyphenylene ether resin.

Carbon Dioxide Content in Molten Resin

The weight of the molded article was measured immediately after the molding. Then the molded article was kept in an air drier for 24 hours or more at a temperature of 120° C. for the polycarbonate resin and the modified polyphenylene ether resin, and 80° C. for the rubber reinforced polystyrene resin and the acrylic resin. The weight of the molded article was measured after it had reached a constant weight by diffusion of carbon dioxide. The difference of the measured weights was defined as the carbon dioxide content in the plasticized molten resin.

Example 1

A polycarbonate resin (PC) was dried in a hot air drier at 120° C. for 5 hours. The resin was then transferred into a closed container kept at 15° C. The container was evacuated to not higher than 1 hPa, and was filled with carbon dioxide at a pressure of 0.09 MPa. The polycarbonate resin was allowed to stand in the container with the pressure kept constant for 24 hours. The amount of carbon dioxide absorbed by the resin was 0.8% by weight from the difference between the resin weight after the drying and that after storage in the carbon dioxide atmosphere. This polycarbonate resin having absorbed carbon dioxide was molded with the square-plate mold at a mold surface temperature of 80° C. by the counter pressure molding process using carbon dioxide. The resin pressure required for resin filling was measured in the cylinder of the molding machine. The required pressure was 204 MPa under conditions of a resin filling time of 0.63 second and a counter pressure of 1 MPa. After the filling with the resin, the internal pressure of the cylinder was kept at 190 MPa for 5 seconds. After cooling for 20 seconds, the molded article was taken out. The obtained molded article was transparent without a foaming pattern on the surface thereof. The carbon dioxide content in the plasticized molten resin was 0.4% by weight from the weight decrease of the molded article after the injection molding.

Comparative Example 1

A polycarbonate resin (PC) was dried in a hot air drier at 120° C. for 5 hours. The resin was then transferred into a closed container kept at 15° C. The container was evacuated to not higher than 1 hPa and kept for 24 hours. The polycarbonate resin not containing carbon dioxide was tested in the same manner as in Example 1 for the resin pressure required for resin filling in the cylinder of the molding machine. Without application of the counter pressure and even by application of 225 MPa, which is the maximum pressure of the molding machine, the mold could not be filled completely in the same filling time as in Example 1. Even by filling operation for 2 to 3 seconds, only a short-shot molded article was obtained with the plate end of the mold unfilled.

TABLE 1

Resin Filling Pressure Required in Example and Comparative Example
Mold: Square flat plate
Filling time: 0.63 second

| | Resin | Mold temperature (° C.) | $CO_2$ absorption pressure (MPa) | $CO_2$ content in molten resin (wt %) | Pressure required for resin filling (MPa) |
|---|---|---|---|---|---|
| Example 1 | PC | 80 | 0.09 | 0.40 | 204 |
| Comparative Example 1 | PC | 80 | 0 | 0 | ≧225* |

*Short shot, mold not completely filled in 0.63 second at 225 MPa

Example 2

A rubber-reinforced polystyrene resin (HIPS) was dried in a hot air drier at 80° C. for 5 hours. The resin was then transferred to a closed container kept at 25° C. The container was evacuated to not higher than 1 hPa, and was filled with carbon dioxide at a pressure of 2.0 MPa. The resin was allowed to stand in the container with the pressure kept constant for 24 hours. The amount of carbon dioxide absorbed by the resin was 3.5% by weight from the difference between the resin weight after the drying and that after storage in the carbon dioxide atmosphere. This rubber-reinforced polystyrene resin having absorbed carbon dioxide was molded with the rectangular plate mold at a mold surface temperature of 40° C. by the counter pressure molding process using carbon dioxide. The resin pressure required for resin filling in the cylinder of the molding machine and the required counter pressure were measured. The required resin pressure was 118 MPa for the resin filling time of 0.52 second and the counter pressure was 5.0 MPa. After filling with the resin, the internal pressure of the cylinder was kept at 110 MPa for 5 seconds. After cooling for 20 seconds, the molded article was taken out. The obtained molded article had excellent appearance without a foaming pattern on the surface. The carbon dioxide content in the plasticized molten resin was 1.8% by weight from the weight decrease of the molded article after the injection molding.

Example 3

An acrylic resin (PMMA) was dried in a hot air drier at 80° C. for 5 hours. The resin was then transferred to a closed container kept at 25° C. The container was evacuated to not higher than 1 hPa, and was filled with carbon dioxide at a pressure of 2.0 MPa. The resin was allowed to stand in the container with the pressure kept constant for 24 hours. The amount of carbon dioxide absorbed by the resin was 1.7% by weight from the difference between the resin weight after the drying and that after storage in the carbon dioxide atmosphere. This acrylic resin having absorbed carbon dioxide was molded with the rectangular plate mold at a mold surface temperature of 90° C. by the counter pressure molding process using carbon dioxide. The resin pressure required for resin filling in the cylinder of the molding machine and the required counter pressure were measured. The required resin pressure was 146 MPa for the resin filling time of 0.52 second, and the counter pressure was 1.0 MPa. After the filling with the resin, the internal pressure of the cylinder was kept at 130 MPa for 5 seconds. After cooling for 20 seconds, the molded article was taken out. The obtained molded article was transparent without a foaming pattern on the surface. The carbon dioxide content in the plasticized molten resin was 0.25% by weight from the weight decrease of the molded article after the injection molding.

Example 4

A modified polyphenylene ether resin (mPPE) was dried in a hot air drier at 100° C. for 5 hours. The resin was then transferred into a closed container kept at 25° C. The container was evacuated to not higher than 1 hPa, and was filled with carbon dioxide at a pressure of 2.0 MPa. The resin was allowed to stand in the container with the pressure kept constant for 24 hours. The amount of carbon dioxide absorbed by the resin was 6.7% by weight from the difference between the resin weight after the drying and that after storage in the carbon dioxide atmosphere. This modified polyphenylene ether resin having absorbed carbon dioxide was molded with the rectangular plate mold at a mold surface temperature of 90° C. by the counter pressure molding process using carbon dioxide. The resin pressure required for resin filling in the cylinder of the molding machine and the required counter pressure were measured. The required resin pressure was 240 MPa for the resin filling time of 0.52 second, and the counter pressure was 8.0 MPa. After the filling with the resin, the internal pressure of the cylinder was kept at 220 MPa for 5 seconds. After cooling for 20 seconds, the molded article was taken out. The obtained molded article had excellent appearance without a foaming pattern on the surface. The carbon dioxide content in the plasticized molten resin was 2.1% by weight from the weight decrease of the molded article after the injection molding.

Comparative Example 2

A rubber-reinforced polystyrene resin (HIPS) was dried in a hot air drier at 80° C. for 5 hours. The resin was then transferred into a closed container kept at 25° C. The container was evacuated to not higher than 1 hPa, and was allowed to stand for 24 hours. This rubber-reinforced polystyrene resin not containing carbon dioxide was tested in the same manner as in Example 2 for the resin pressure required for resin filling in the cylinder of the molding machine. Without application of the counter pressure, the required resin filling pressure was 179 MPa for the resin filling time of 0.52 second.

Comparative Example 3

An acrylic resin (PMMA) was dried in a hot air drier at 80° C. for 5 hours. The resin was then transferred into a closed container kept at 25° C. The container was evacuated to not higher than 1 hPa, and was allowed to stand for 24 hours. This acrylic resin not containing carbon dioxide was tested in the same manner as in Example 3 for the resin pressure required for resin filling in the cylinder of the molding machine. Without application of the counter pressure, the required resin filling pressure was 172 MPa for the resin filling time of 0.52 second.

Comparative Example 4

A modified polyphenylene ether resin (mPPE) was dried in a hot air drier at 100° C. for 5 hours. The resin was then transferred into a closed container kept at 25° C. The container was evacuated to not higher than 1 hPa, and was allowed to stand for 24 hours. This modified polyphenylene ether resin not containing carbon dioxide was tested in the same manner as in Example 4 for the resin pressure required for resin filling in the cylinder of the molding machine. Without application of the counter pressure and by application of the maximum pressure of 280 MPa of the molding machine, a short-shot molded article only was obtained in a fan shape of radius of 2 cm with the center at the gate position.

Comparative Example 5

The resin employed in Example 4 was injection-molded the rectangular flat plate mold at a surface temperature of 90° C. without a counter pressure at a resin filling time of 0.52 second. As the result, the obtained molded article had a remarkable foaming pattern on the surface.

TABLE 2

Resin Filling Pressure Required in Example and Comparative Example
Mold: Rectangular flat plate
Filling time: 0.52 second

| Mold temper- | $CO_2$ absorp- tion | $CO_2$ content in molten | Pressure required for resin |
| --- | --- | --- | --- |

| | Resin | ature (° C.) | pressure (MPa) | resin (wt %) | filling (MPa) |
|---|---|---|---|---|---|
| Example | | | | | |
| 2 | HIPS | 40 | 2.0 | 1.8 | 118 |
| 3 | PMMA | 90 | 2.0 | 0.25 | 146 |
| 4 | mPPE | 90 | 2.0 | 2.1 | 240 |
| Comparative Example | | | | | |
| 2 | HIPS | 40 | 0 | 0 | 179 |
| 3 | PMMA | 90 | 0 | 0 | 172 |
| 4 | mPPE | 90 | 0 | 0 | ≧280* |

*Short shot (fan shape of radius 2 cm), mold not filled at 280 MPa

INDUSTRIAL APPLICABILITY

The present invention facilitates molding of resins such as those not readily moldable in spite of the excellent properties thereof, e.g., high-molecular weight resins, those containing a flame retardant which are difficult to be molded at a high temperature owing to their poor thermal stability, and the like resins. Therefore, the present invention extends freedom in selection of resins upon designing resin parts and in selection of materials for resin development. Furthermore, the present invention is promising even for molding of conventional resins as for uses where high flowability is required, for example, for molding of an optical disk, a light guiding plate for liquid crystal display back light, a thin case of a handy personal computer, and so forth to improve the quality of the molded articles or to extend freedom in product design.

What is claimed is:

1. A method for injection molding of a thermoplastic resin, which comprises injecting a molten resin in which not less than 0.2% by weight of carbon dioxide is dissolved so as to lower the melt viscosity thereof, into a mold cavity pressurized with carbon dioxide beforehand to at least a pressure where foaming does not take place in the flow front of the molten resin; and pressurizing the injected molten resin so as to be cooled and solidified under a high pressure.

2. The method for injection molding according to claim 1, wherein the amount of the carbon dioxide dissolved in the molten resin is not lower than 0.2% by weight and not higher than 3% by weight.

3. The method for injection molding according to claim 1, wherein the pressure of the gas that pressurizes the mold cavity is above the atmospheric pressure and not higher than 15 MPa.

4. The method for injection molding according to claim 1, wherein the injected molten resin is solidified without foaming.

* * * * *